(12) United States Patent
Anagawa et al.

(10) Patent No.: US 7,813,085 B2
(45) Date of Patent: Oct. 12, 2010

(54) THIN-FILM MAGNETIC HEAD HAVING LAMINATE SHIELDS FOR TOLERATING EXTERNAL MAGNETIC FIELD

(75) Inventors: Kenkichi Anagawa, Tokyo (JP); Hiraku Hirabayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 826 days.

(21) Appl. No.: 11/694,310

(22) Filed: Mar. 30, 2007

(65) Prior Publication Data
US 2008/0239584 A1 Oct. 2, 2008

(51) Int. Cl.
*G11B 5/17* (2006.01)
(52) U.S. Cl. ............ 360/319; 360/123.12; 360/123.37; 360/123.58
(58) Field of Classification Search ............ 360/123.12, 360/123.37, 123.58, 125.3, 127.71, 125.72, 360/125.73, 128, 319
See application file for complete search history.

(56) References Cited

U.S. PATENT DOCUMENTS 6,081,409 A * 6/2000 Hughbanks et al. ......... 360/128
7,450,349 B2 * 11/2008 Nishida et al. ............ 360/319
2006/0092565 A1 5/2006 Ho et al.

FOREIGN PATENT DOCUMENTS

JP 2004-39148 2/2004
JP 2006-114160 4/2006

* cited by examiner

*Primary Examiner*—A.J. Heinz
(74) *Attorney, Agent, or Firm*—Oblon, Spivak, McClelland, Maier & Neustadt, L.L.P.

(57) ABSTRACT

A thin-film magnetic head having an MR element in which the tolerance of external magnetic field is improved even under the condition that shields have smaller areas. The head includes: an MR element includes lower and upper shield layers provided so as to sandwich an MR multilayer, one of edges of each of the layers reaching a head end surface on an ABS side; and an electromagnetic transducer including main and auxiliary magnetic pole layers, one of edges of each of the layers reaching the head end surface, wherein at least one laminate shield layer for tolerating an external magnetic field is provided adjacently on one side or on both sides in a track width direction of at least one layer out of the upper and lower shield layers and the auxiliary magnetic pole layer, and one edge of the at least one laminate shield layer reaching the head end surface.

27 Claims, 10 Drawing Sheets

Fig. 1

TRACK WIDTH
DIRECTION

THIN-FILM MAGNETIC HEAD HAVING LAMINATE SHIELDS FOR TOLERATING EXTERNAL MAGNETIC FIELD

BACKGROUND OF THE INVENTION

1. Field of the Invention

The present invention relates to a thin-film magnetic head for applying to a magnetic recording technique in which the head writes/reads data to/from a magnetic recording medium, especially to a thin-film magnetic head for applying to perpendicular magnetic recording. The present invention further relates to a head gimbal assembly (HGA) provided with the thin-film magnetic head, and a magnetic recording and reproducing apparatus provided with the HGA.

2. Description of the Related Art

In recent years, perpendicular magnetic recording has been actively developed instead of conventional longitudinal magnetic recording to realize more improvement in a real recording density of magnetic recording and reproducing apparatuses, especially magnetic disk drive apparatuses. In the perpendicular magnetic recording, demagnetization field drastically decreases in a magnetization transition region between record bits on a magnetic recording medium, and therefore, the magnetization transition width can become much smaller than that of the longitudinal magnetic recording. Furthermore, the record bit formed by the perpendicular magnetic recording is not greatly affected by a thermal fluctuation that becomes serious problem for achieving higher recording density in the longitudinal magnetic recording. As described above, the perpendicular magnetic recording has a potential to realize more stable and higher recording density, and therefore, thin-film magnetic heads for applying to the perpendicular magnetic recording have been developed intensively.

In the thin-film magnetic head for the perpendicular magnetic recording, a shielded pole structure is recently adopted, which includes a main magnetic pole, an auxiliary magnetic pole as a return yoke, and a write coil for exciting magnetic flux in these magnetic poles. Whereas, the corresponding magnetic recording medium mainly has a stacked structure of a soft-magnetic backing layer for acting as a part of magnetic circuit and a perpendicular recording layer. In some cases using this magnetic recording medium, an external magnetic field is likely to cause a phenomenon in which unwanted writing or erasing of data occur in positions distant from the track to be written. This phenomenon is thought to be derived from that, under the condition of applying the external field to the head, a rather large loop of magnetic flux is generated through the soft-magnetic backing layer and the auxiliary magnetic pole. The magnetic flux of the generated loop has a tendency to concentrate near both ends of the edge on the air bearing surface (ABS) side of the auxiliary magnetic pole, which reaches the head end surface. As a result, magnetic fields generated from the flux-concentrating portions may be likely to cause unwanted writing or erasing.

A magnetoresistive (MR) element provided in the head for reading data usually has upper and lower shields sandwiching an MR multilayer, which is a magneto-sensitive part, between them. In some cases, the upper and lower shields may contribute to the formation of the above-described magnetic flux loop, and magnetic fields generated near both ends of the edge of these shields are likely to cause unwanted writing or erasing.

As a measure for avoiding the unwanted writing or erasing due to the external magnetic field and for improving the tolerance to external magnetic field, Japanese Patent Publication No. 2006-114160A describes an auxiliary magnetic pole, a lower shield or an upper shield which has a concave portion provided on the side opposite to ABS or has a recess from the head end surface on the ABS side at both end portions in the track width direction. This structure with the concave portion or the recess is intended to reduce a leakage magnetic field from the end portions of the auxiliary magnetic pole, the lower shield or the upper shield. Further, US Patent Publication 2006/0092565A1 describes a magnetic structure having a forward projecting portion extending toward ABS and the first and second side wing portions extending from the forward projecting portion along the transverse direction (the track width direction). The publication argues that even if magnetic flux concentrates at the end portion in the track width direction of the side wing portion, the concentrating portion is sufficiently distant from the ABS; therefore, unwanted writing or erasing to the medium can be avoided. Further, Japanese Patent Publication No. 2004-39148A describes a return yoke layer (an auxiliary magnetic pole layer) having tapered surfaces at both end portions in the track width direction. The publication argues that there exist no angles to cause the concentration of magnetic flux in the return yoke layer; therefore, unwanted writing or erasing to the medium can be avoided.

However, these prior techniques cannot correspond to the recent requirement for reducing the area of the upper and lower shields of the MR element.

Recently, to improve the sensitivity of magnetic field in the MR element, a current-perpendicular-to-plane giant magnetoresistive (CPP-GMR) element or a tunnel magnetoresistive (TMR) element has been adopted. In these elements, the shields also act as electrodes, that is, upper and lower shields (electrodes) sandwich an MR multilayer and further an insulating layer for preventing short-circuiting of the sense current. This sandwich structure causes the considerable amount of stray capacitance. This stray capacitance may be likely to cause a noise in the read output of the MR element; therefore, the area of the upper and lower shields is now intended to be set smaller in order to reduce the stray capacitance. Further, even in the case that a current-in-plane giant magnetoresistive (CIP-GMR) element is used as the MR element, the reduction of the areas of shields is also required with the purpose of miniaturizing the head.

However, under the condition that the shields have smaller areas, it is difficult to form the above-described concave portion, the recess portion, the forward projecting portion, the side wing portion, the taper portion and so on with a sufficiently large size. That is, it has been quite difficult to adopt a design for improving the tolerance of external magnetic field into the shield with smaller area.

BRIEF SUMMARY OF THE INVENTION

Therefore, an object of the present invention is to provide a thin-film magnetic head having an MR element in which the tolerance of external magnetic field is improved even under the condition that shields have smaller areas, and to provide a HGA including the thin-film magnetic head and a magnetic recording and reproducing apparatus including the HGA.

Before describing the present invention, terms used herein will be defined. In a multilayer structure of element(s) formed on/above the element formation surface of the substrate in a thin-film magnetic head, a layer or a portion of the layer located on the substrate side (the element formation surface side) in relation to a standard layer is referred to as being located "lower" than, "beneath" or "below" the standard layer, and a layer or a portion of the layer located on the stacking direction side (the opposite side to the substrate) in relation to a standard layer is referred to as being located "upper" than, "on" or "above" the standard layer.

According to the present invention, a thin-film magnetic head is provided, which comprises:

an MR element for reading data, comprising a lower shield layer and an upper shield layer provided so as to sandwich an MR multilayer therebetween, one of edges of each of the upper and lower shield layers reaching a head end surface on an ABS side; and an electromagnetic transducer for writing data, comprising a main magnetic pole layer and an auxiliary magnetic pole layer, one of edges of each of the main and auxiliary magnetic pole layers reaching the head end surface, wherein at least one laminate shield layer for tolerating an external magnetic field is provided adjacently through a non-magnetic material on one side or on both sides in a track width direction of at least one layer out of the lower shield layer, the upper shield layer and the auxiliary magnetic pole layer, and one edge of the at least one laminate shield layer reaching the head end surface.

The above-described laminate shield layer according to the present invention is magnetically coupled with at least one layer out of the lower shield layer, the upper shield layer and the auxiliary magnetic pole layer with certain intensity. Further, one edge of the laminate shield layer reaches the head end surface of the ABS side as well as one of edges of each of these shield layers and magnetic pole layer. Therefore, even when an external magnetic field is applied to the MR element and the electromagnetic transducer, the concentration of magnetic flux due to the external magnetic field becomes difficult to occur near both ends of the edge reaching the head end surface of these shield layers and magnetic pole layer. As a result, the tolerance to external magnetic field is improved, and unwanted writing or erasing to the magnetic recording medium can be suppressed.

In the thin-film head according to the present invention, the spacing in the track width direction between the laminate shield layer and the at least one layer out of the lower shield layer, the upper shield layer and the auxiliary magnetic pole layer is preferably in the range from 20 nm (nanometers) to 1700 nm, and is more preferably in the range from 50 nm to 1200 nm. The width in the track width direction of the laminate shield layer is preferably in the range from 20 nm to 900 nm, and is more preferably in the range from 40 nm to 700 nm.

Further, in the thin-film head according to the present invention, the height of the laminate shield layer from the head end surface is preferably equal to or smaller than a height of the at least one layer out of the lower shield layer, the upper shield layer and the auxiliary magnetic pole layer. It is also preferable that a plurality of laminate shield layers, aligned in the track width direction with a non-magnetic material therebetween, are provided adjacently on each of both sides in the track width direction of at least one layer out of the lower shield layer, the upper shield layer and the auxiliary magnetic pole layer, and one of edges of each of the plurality of laminate shield layers reach the head end surface.

Further, in the thin-film head according to the present invention, it is also preferable that an inter-element shield layer is provided between the MR element and the electromagnetic transducer, and laminate shield layers for tolerating an external magnetic field are further provided adjacently through a non-magnetic material on both sides in the track width direction of the inter-element shield layer, one of edges of each of the laminate shield layers reaching the head end surface.

According to the present invention, an HGA is further provided, which comprises: the above-described thin-film magnetic head; signal lines for the MR element and the electromagnetic transducer; and a support means for supporting the thin-film magnetic head.

According to the present invention, a magnetic recording and reproducing apparatus is further provided, which comprises: at least one HGA described above; at least one magnetic recording medium; and a recording/reproducing means for controlling read and write operations of the thin-film magnetic head to the at least one magnetic recording medium.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

DETAILED DESCRIPTION OF THE INVENTION

Figure 1:
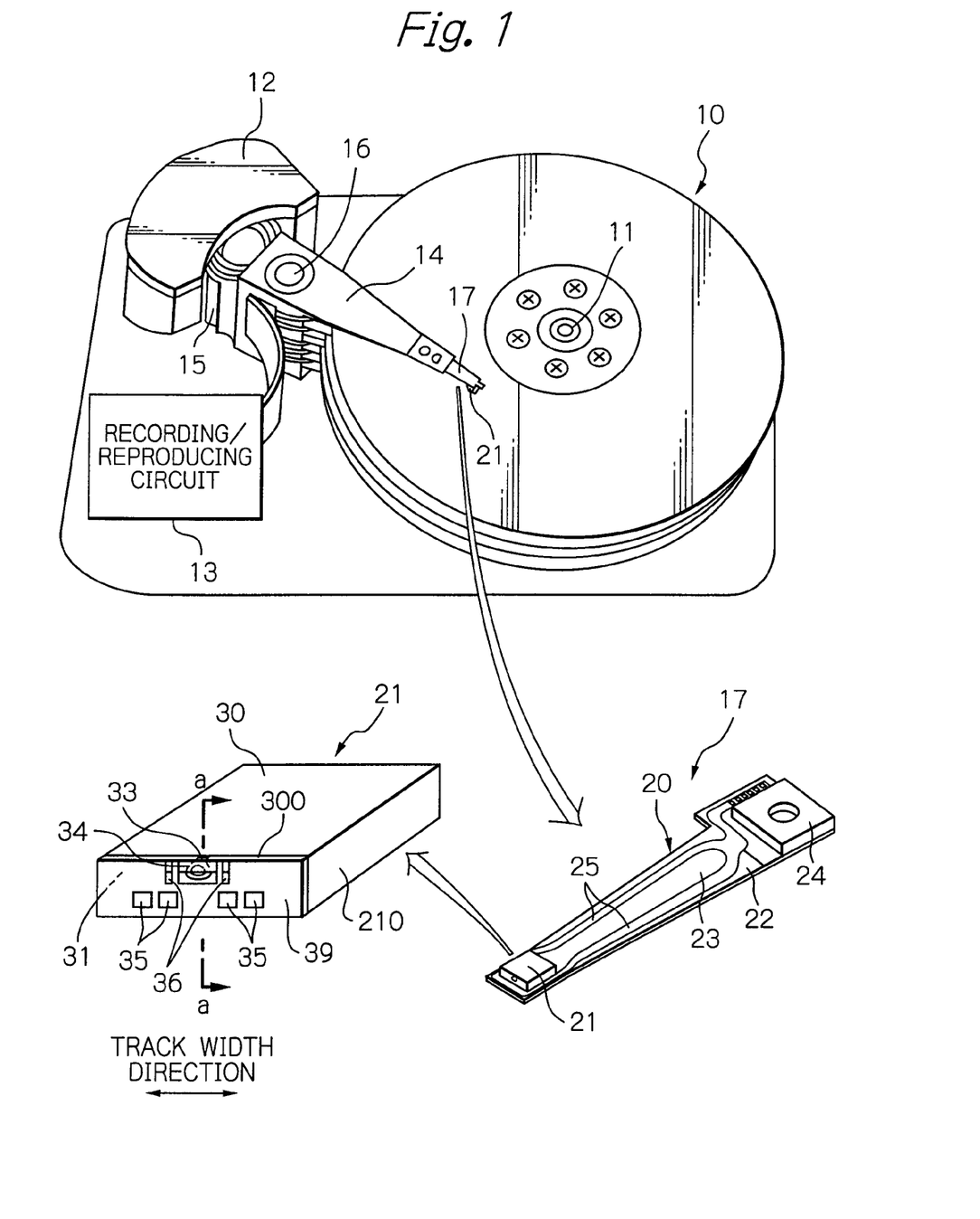
FIG. 1 shows perspective views schematically illustrating configurations of one embodiments of a magnetic recording and reproducing apparatus, an HGA and a thin-film magnetic head according to the present invention.

FIG. 1 shows perspective views schematically illustrating configurations of one embodiments of a magnetic recording and reproducing apparatus, an HGA and a thin-film magnetic head according to the present invention. In magnified views of the HGA and the thin-film magnetic head of FIG. 1, the side opposed to a magnetic disk is turned upward.

The magnetic recording and reproducing apparatus shown in FIG. 1 is a magnetic disk drive apparatus, which includes: multiple magnetic disks 10 as magnetic recording media which rotate about a spindle of a spindle motor 11; an assembly carriage device 12 provided with multiple drive arms 14; HGAs 17 each of which is attached on the end portion of each drive arm 14 and is provided with a thin-film magnetic head (slider) 21; and a recording/reproducing circuit 13 for controlling read/write operations.

The magnetic disk 10 is designed for perpendicular magnetic recording, and has a stacked structure including a soft-magnetic backing layer for acting as a part of magnetic circuit and a perpendicular recording layer, which are formed on/above the disk substrate. The assembly carriage device 12 is provided for positioning the thin-film magnetic head 21 above a track formed on the magnetic disk 10. In the device 12, the drive arms 14 are stacked along a pivot bearing axis 16 and are capable of angular-pivoting about the axis 16 driven by a voice coil motor (VCM) 15. The numbers of magnetic disks 10, drive arms 14, HGAs 17, and thin-film magnetic heads 21 may be one.

While not shown in the figure, the recording/reproducing circuit 13 includes: a recording/reproducing control LSI; a write gate for receiving data to be recorded from the recording/reproducing control LSI; an write circuit for outputting a signal from the write gate to an electromagnetic transducer for writing data; a constant current circuit for supplying a sense current to an MR element for reading data; an amplifier for amplifying output voltage from the MR element; and a demodulator circuit for demodulating the amplified output voltage and outputting reproduced data to the recording/reproducing control LSI.

Also as shown in FIG. 1, in the HGA 17, the thin-film magnetic head 21 is fixed and supported on the end portion of a suspension 20 in such a way to face the surface of each magnetic disk 10 with a predetermined spacing (flying height). And one end of a wiring member 25 is electrically connected to electrodes of the thin-film magnetic head 21.

The suspension 20 includes: a load beam 22; an flexure 23 with elasticity fixed on the load beam 22; a base plate 24 provided on the base portion of the load beam 22; and a wiring member 25 that is provided on the flexure 23 and consists of lead conductors as signal lines and connection pads electrically connected to both ends of the lead conductors. While not shown in the figure, a head drive IC chip may be attached at some midpoints of the suspension 20.

Also as shown in FIG. 1, the thin-film magnetic head 21 includes: a slider substrate 210 having an air bearing surface (ABS) 30 processed so as to provide an appropriate flying height and an element formation surface 31; an MR element 33 as a read head element for reading data and an electromagnetic transducer 34 as a write head element for writing data, which are formed on/above the element formation surface 31; an overcoat layer 39 formed so as to cover the MR element 33 and the electromagnetic transducer 34; and four signal electrodes 35 exposed in the upper surface of the overcoat layer 39. Here, the ABS 30 of the thin-film magnetic head 21 is opposed to the magnetic disk 10. And respective two of the four signal electrodes 35 are connected to the MR element 33 and the electromagnetic transducer 34.

One ends of the MR element 33 and the electromagnetic transducer 34 reach the head end surface 300 on the ABS 30 side. These ends face the surface of the magnetic disk 10, and then, a read operation is performed by sensing a signal magnetic field from the disk 10, and a write operation is performed by applying a write magnetic field to the disk 10. A predetermined area of the head end surface 300 that these ends reach may be coated with diamond like carbon (DLC), etc. as an extremely thin protective film.

Laminate shield layers 36 for tolerating external magnetic field are provided on both sides in the track width direction of (a) shield layer(s) in the MR element 33 and/or of an auxiliary magnetic pole layer in the electromagnetic transducer 34. One ends of the laminate shield layers 36 reach the head end surface 300. Generally, when an external magnetic field is applied to the thin-film magnetic head 21, a phenomenon has a possibility to occur, in which unwanted writing or erasing of data occur in positions distant from the track to be written. This phenomenon is derived from that a rather large loop of magnetic flux is generated through the soft-magnetic backing layer of the magnetic disk 10. The laminate shield layers 36 are designed for suppressing the occurrence of the phenomenon and thus improving the tolerance to external magnetic field of the head.

Figure 2:
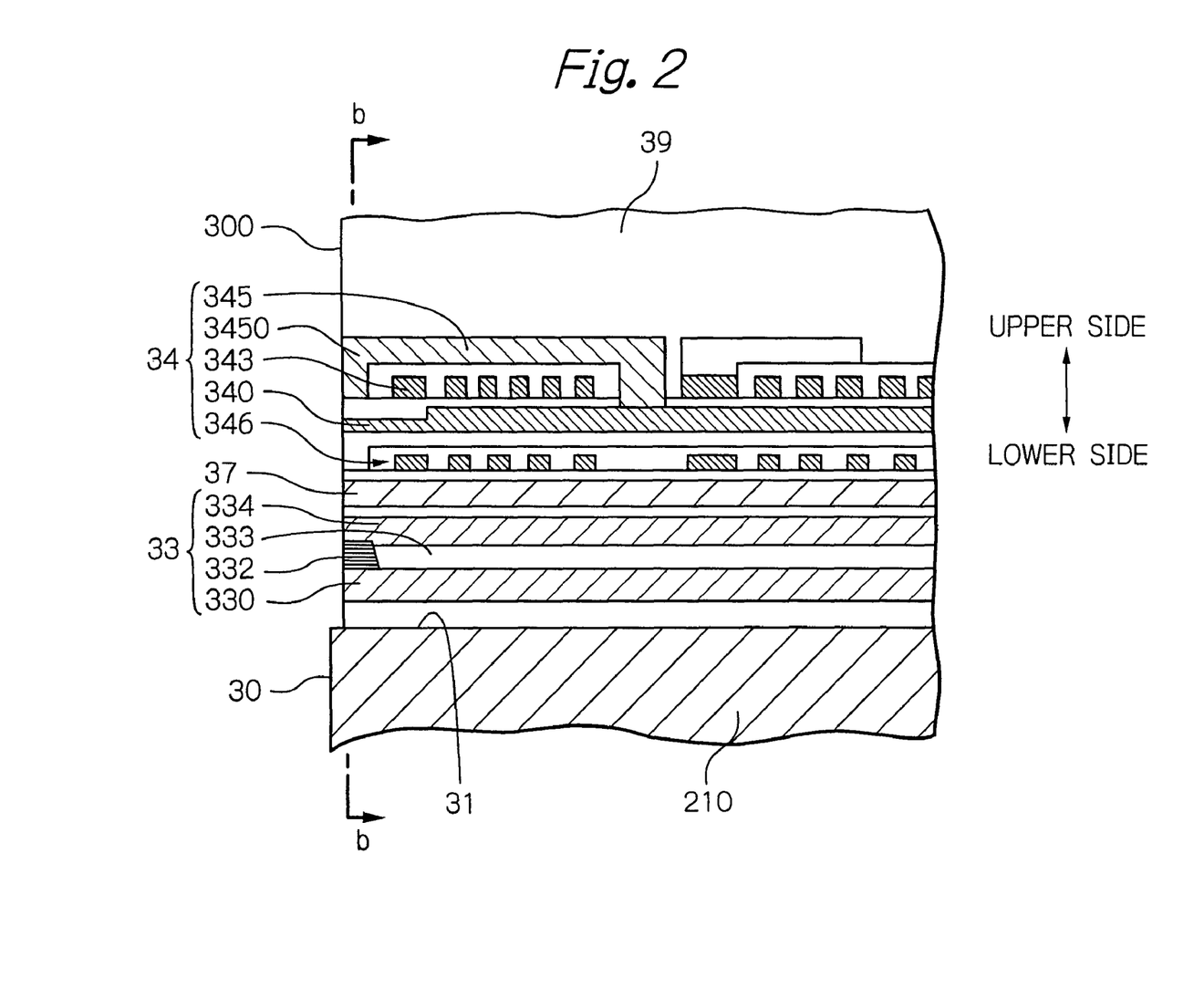
FIG. 2 shows a cross-sectional view taken along line a-a in FIG. 1, schematically illustrating a main portion of the thin-film magnetic head.

FIG. 2 shows a cross-sectional view taken along line a-a in FIG. 1, schematically illustrating a main portion of the thin-film magnetic head 21.

In FIG. 2, the MR element 33 is a tunnel magnetoresistive (TMR) element or a current-perpendicular-to-plane giant magnetoresistive (CPP-GMR) element, and includes: an MR multilayer 332; an insulating layer 333 covering at least the rear side surface of the MR multilayer 332; and a lower shield layer 330 and an upper shield layer 334 which sandwich the MR multilayer 332 and the insulating layer 333. The MR multilayer 332 senses a signal magnetic field from the magnetic disk with very high sensitivity. The upper and lower shield layers 334 and 330 act as electrodes to apply a sense current in the direction perpendicular to the stacked surface of the MR multilayer 332, and further play a role of shielding external magnetic field that cause a noise for the MR multilayer 332. The upper and lower shield layers 334 and 330 are formed of a soft-magnetic conductive material containing such as NiFe (Permalloy), CoFeNi, CoFe, FeN or FeZrN with thickness of approximately 0.3 to 5 μm (micrometers), made by using, for example, a frame plating or a sputtering method.

The MR multilayer 332 includes: an antiferromagnetic layer formed of an antiferromagnetic material; a pinned layer formed mainly of a ferromagnetic material; a non-magnetic intermediate layer formed of an oxide (in the case of TMR element) or of a non-magnetic metal (in the case of CPP-GMR element); and a free layer formed of a ferromagnetic material. In the case of using the TMR element, the magnetizations of the pinned layer and the free layer make a ferromagnetic tunnel coupling with the non-magnetic intermediate layer as a barrier of tunnel effect. Thus, when the magnetization direction of the free layer changes in response to a signal magnetic field, a tunnel current increases/decreases due to the variation in the state densities of up and down spin bands of conduction electrons in the pinned layer and the free layer, which changes the electric resistance of the MR multilayer 332. The measurement of this resistance change enables a weak and local signal field to be detected with high sensitivity.

As described above, in the MR element 33 according to the present embodiment, the upper and lower shield layers 334 and 330 also act as electrodes, and sandwich the MR multilayer 332 and the insulating layer 333. This structure is equivalent to a certain capacitor, and therefore, generates a considerable stray capacitance. The stray capacitance is likely to cause the degradation of high-frequency characteristic of the read output from the MR element 33. To reduce the stray capacitance, the areas of the upper and lower shield layers 334 and 330 are preferably set to be smaller. For example, the amount of each area of the upper and lower shield layers is decreased from approximately 90×25 μm$^2$ (square micrometers), which is one of conventional values, to approximately 65×25 μm$^2$. The above described laminate shield layers 36 are provided for improving the tolerance to external magnetic field, even under the condition that the shield layers have such smaller areas. The reduction of the stray capacitance becomes more important, especially as the frequency of data signals increases. Conventionally, it has been thus difficult to adopt the design for improving the tolerance to external magnetic field into the smaller shield layers corresponding to higher frequency of data signals. However, by adopting the laminate shield structure according to the present invention, the tolerance to external magnetic field can be improved even in the smaller shield layers.

The MR element 33 may be a CIP-GMR element. Even in the case, the reduction of the areas of upper and lower shield layers is also required with the necessity of miniaturizing the head. Any of the TMR element, the CPP-GMR element and the CIP-GMR element can receive a signal magnetic field with extremely high sensitivity. In the case of using the CIP-GMR element, upper and lower shield gap layers are provided between the MR multilayer 332 and respective upper and lower shield layers 334 and 330, and further, MR lead conductor layers are formed for supplying the MR multilayer 332 with a sense current.

Also as shown in FIG. 2, the electromagnetic transducer 34 is designed for perpendicular magnetic recording, and includes: a main magnetic pole layer 340 formed of a soft-magnetic material such as NiFe (Permalloy), CoFeNi, CoFe, FeN or FeZrN with total thickness of approximately 0.5 to 3 μm; a write coil layer 343 formed of an conductive material such as Cu (copper); and an auxiliary magnetic pole layer 345 formed of a soft-magnetic material such as NiFe (Permalloy), CoFeNi, CoFe, FeN or FeZrN with total thickness of approximately 0.5 to 5 μM. The main magnetic pole layer 340 is a magnetic path for converging and guiding a magnetic flux excited by a write current flowing through the write coil layer 343 toward the recording layer of the magnetic disk 10. The layer thickness of the end portion on the head end surface 300 side of the main magnetic pole layer 340 becomes smaller than that of the other portions. As a result, the main magnetic pole layer 340 can generate fine write fields corresponding to higher density recording. The write coil layer 343 has a monolayer structure in the present embodiment, however, may have a two or more layered structure or a helical coil shape. Further, the number of turns of the write coil layer 343 is not limited to that shown in FIG. 2.

The end portion in the head end surface 300 side of the auxiliary magnetic pole layer 345 becomes a trailing shield portion 3450 that has a layer cross-section larger than that of the other portions. The trailing shield portion 3450 causes the magnetic field gradient between the end portion of the trailing shield portion 3450 and the end portion of the main magnetic pole layer 340 to be steeper. As a result, a jitter of signal outputs becomes smaller, and therefore, an error rate during reading can be reduced.

Further, in the present embodiment, an inter-element shield layer 37 is provided between the MR element 33 and the electromagnetic transducer 34. The inter-element shield layer 37 may be formed of the same soft-magnetic material as the upper and lower shield layers 334 and 330, and the thickness of the layer 37 is in the range of approximately 0.5 to 5 μm. Further, in the present embodiment, the electromagnetic transducer 34 is provided with a backing coil portion 346 as well as the write coil layer 343. The backing coil portion 346 is provided for suppressing a wide area adjacent-track erase (WATE) behavior, which is an unwanted write or erase operation to the magnetic disk, by generating a magnetic flux for negating a magnetic flux loop that arises from the electromagnetic transducer 34 through the upper and lower shield layers 334 and 330 of the MR element 33.

Figure 3A:
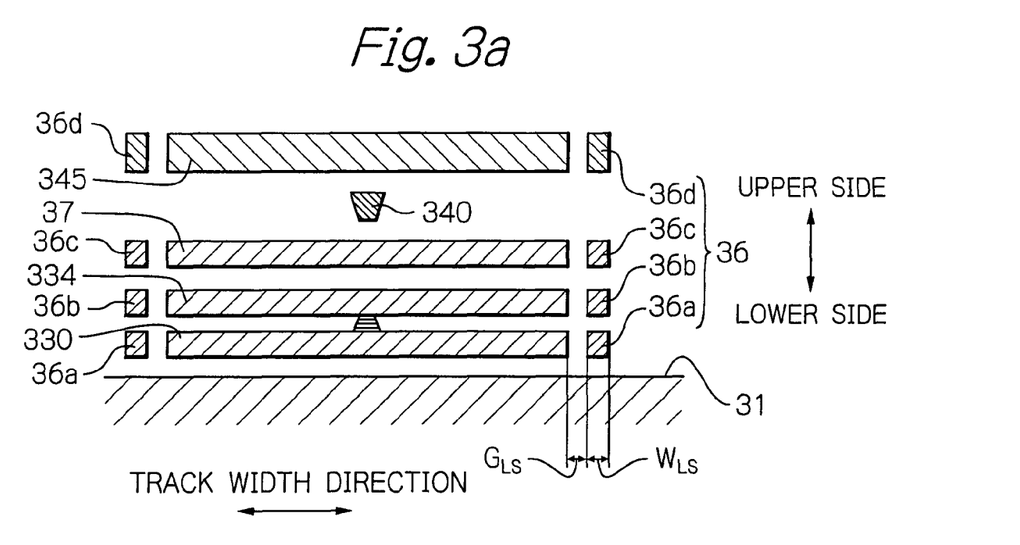
FIGS. 3a and 3b show a cross-sectional view and a top view, schematically illustrating a position and shape of the laminate shield layers.
Figure 3B:
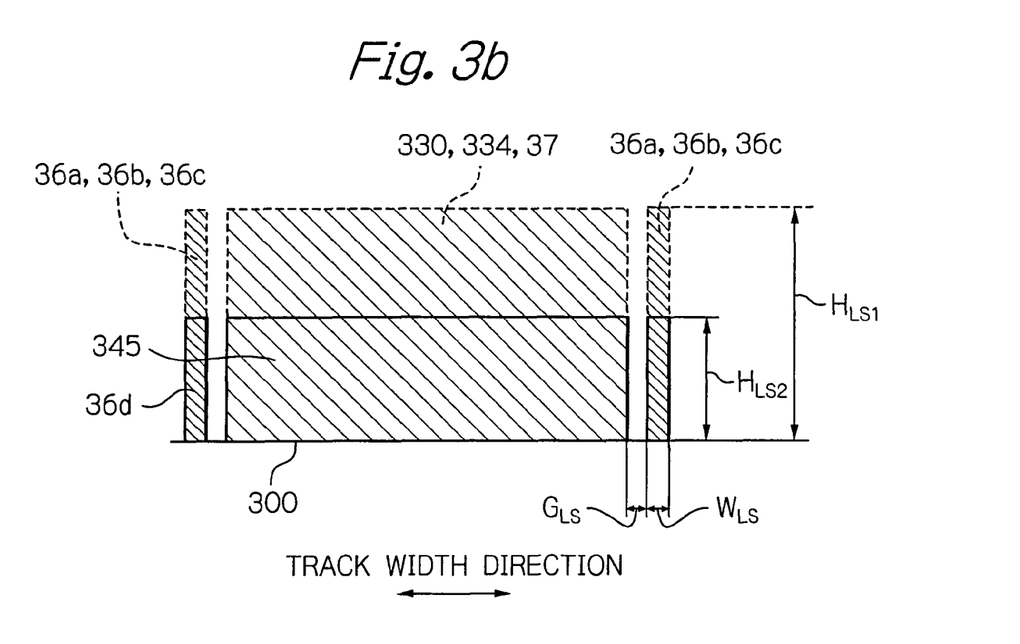

FIGS. 3a and 3b show a cross-sectional view and a top view, schematically illustrating a position and shape of the laminate shield layers 36. The cross-section in FIG. 3a is taken along line b-b in FIG. 2, and the top view in FIG. 3b is obtained when viewing down the MR element 33 and the electromagnetic transducer 34 shown in FIG. 2 from the upper side of the element formation surface 31.

As shown in FIG. 3a, laminate shield layers 36a, 36b, 36c and 36d are provided in positions, through a non-magnetic material with a gap width $G_{LS}$, adjacent to both sides in the track width direction of the lower shield layer 330, the upper shield layer 334, the inter-element shield layer 37, and the auxiliary magnetic pole layer 345 respectively. The gap width $G_{LS}$ is a spacing along the track width between the laminate shield layer and the corresponding shield layer or magnetic pole layer, and is preferably in the range of 20 to 1700 nm (nanometers) as described later. The width $W_{LS}$ in the track width direction of each of the laminate shield layers 36 is preferably in the range of 20 to 900 nm as also described later.

In the manufacturing process, the laminate shield layers 36a, 36b, 36c and 36d may be formed concurrently with the lower shield layer 330, the upper shield layer 334, the inter-element shield layer 37, and the auxiliary magnetic pole layer 345, respectively. That is to say, the constituent materials of these laminate shield layers may be the same as the soft-magnetic materials constituting the lower shield layer 330, the upper shield layer 334, the inter-element shield layer 37, and the auxiliary magnetic pole layer 345, respectively. Further, the thicknesses of these laminate shield layers may be the same as those of the lower shield layer 330, the upper shield layer 334, the inter-element shield layer 37, and the auxiliary magnetic pole layer 345, respectively. Especially, the laminate shield layer 36d may have a larger thickness than that of the portion other than the trailing shield portion 3450 of the auxiliary magnetic pole layer 345, as the trailing shield portion 3450 has.

The non-magnetic material having gap width $G_{LS}$ may be the constituent material of the overcoat layer 39, that is, a non-magnetic insulating material such as $Al_2O_3$ (alumina) or $SiO_2$ (silicon), or may be a non-magnetic metal such as Cu or Al. However, the non-magnetic materials separating the laminate shield layers 36b and 36a from the upper and lower shield layers 334 and 330 respectively are preferably non-magnetic insulating materials to avoid the substantial increase in area of the shield layers as electrodes.

According to FIG. 3b, one ends of the laminate shield layers 36a, 36b, 36c and 36d reach the head end surface 300 as well as one ends of the upper and lower shield layers 334 and 330, the inter-element shield layer 37 and the auxiliary magnetic pole layer 345. Further, the height $H_{LS1}$ (the length in the direction perpendicular to the head end surface 300) of the laminate shield layers 36a, 36b and 36c is equal to the height from the head end surface 300 of the upper and lower shield layers 334 and 330 and the inter-element shield layer 37. While the height $H_{LS2}$ from the head end surface 300 of the laminate shield layer 36d is equal to the height from the head end surface 300 of the auxiliary magnetic pole layer 345.

As understood from the above-described configuration, the laminate shield layers 36 are adjacent to the upper and lower shield layers 334 and 330, the inter-element shield layer 37 and the auxiliary magnetic pole layer 345 with the gap $G_{LS}$, and thus are magnetically coupled to these shield layers and magnetic pole layer with certain intensity. Further, one edges of the laminate shield layers 36 reach the head end surface 300 as well as one edges of these shield layers and magnetic pole layer; thus, the magnetic couplings are maintained even at positions on the head end surface 300. Therefore, even when an external magnetic field is applied to the MR element 33 and the electromagnetic transducer 34, the concentration of magnetic flux due to the external magnetic field becomes difficult to occur near both ends of the edge reaching the head end surface 300 of these shield layers and magnetic pole layer. As a result, the tolerance to external magnetic field is improved, and unwanted writing or erasing to the magnetic disk can be suppressed. Meanwhile, in the present embodiment, the height of the laminate shield layers 36a, 36b, 36c and 36d are equal to the height of the lower shield layer 330, the upper shield layer 334, the inter-element shield layer 37, and the auxiliary magnetic pole layer 345, respectively. Alternatively, at least one laminate shield layer may have a height smaller than the height of the adjacent shield layer or magnetic pole layer. This configuration also effects the above-described improvement of the tolerance to external magnetic field. Further, in the present embodiment, the laminate shield layers 36a, 36b, 36c and 36d are provided on both sides of these shield layers and magnetic pole layer, however, in each of the laminate shield layers, the laminate shield layer may be provided only on one side. This configuration also effects the corresponding improvement of the tolerance to external magnetic field.

FIGS. 4a to 4j show cross-sectional views and top views, schematically illustrating various alternatives of the laminate shield layers in the thin-film magnetic head according to the present invention. The cross-sections in FIGS. 4a to 4d, 4/1, 4h to 4j are corresponding to those taken along line b-b in FIG. 2 as well as FIG. 3a, and the top views in FIGS. 4e, 4/2, 4/3 and 4g are obtained when viewing down from the upper side of the element formation surface 31 as well as FIG. 3b.

As shown in FIGS. 4a to 4d, respective laminate shield layers 40, 41, 42 and 43 are provided adjacently, through a non-magnetic material with a gap width $G_{LS}$, on both sides in the track width direction of the lower shield layer 330, the upper shield layer 334, the inter-element shield layer 37, and the auxiliary magnetic pole layer 345. That is, the laminate shield layers may be provided adjacently on both sides in the track width direction of one layer out of the lower shield layer 330, the upper shield layer 334, the inter-element shield layer 37, and the auxiliary magnetic pole layer 345. Further, though not shown in the figure, the laminate shield layers may be provided adjacently on both sides in the track width direction of two layers (for example, upper and lower shield layers 334 and 330) or three layers out of these shield layers and magnetic pole layer. Actually, the distribution of the degree of the tolerance to external magnetic field depends on the configuration of shield layers and magnetic pole layers formed on the element formation surface 31, and various distributions are possible. Therefore, providing the laminate shield layers in positions where the tolerance to external magnetic field is lower can improve the total tolerance of the head sufficiently.

Figure 4A:
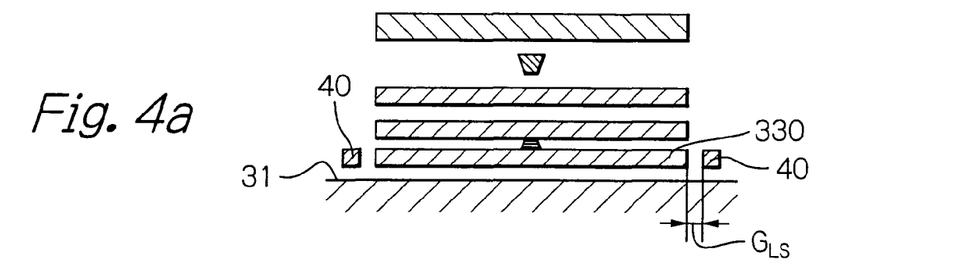
FIGS. 4a to 4j show cross-sectional views and top views, schematically illustrating various alternatives of the laminate shield layers in the thin-film magnetic head according to the present invention.
Figure 4B:
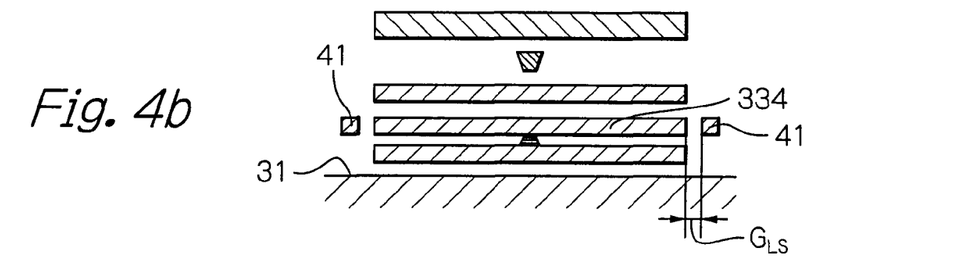
Figure 4C:
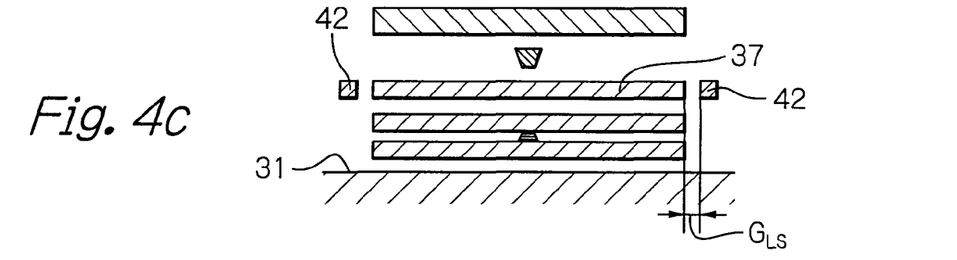
Figure 4D:
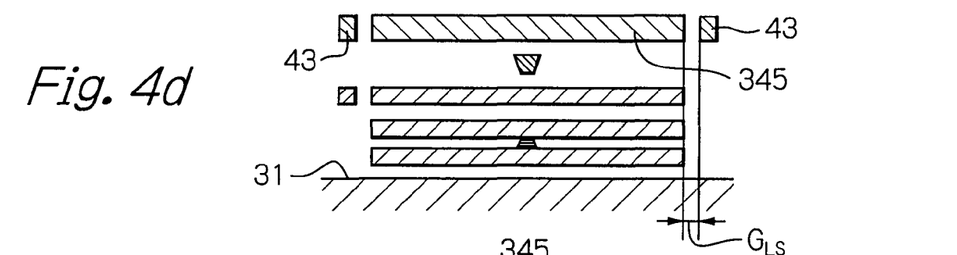
Figure 4E:
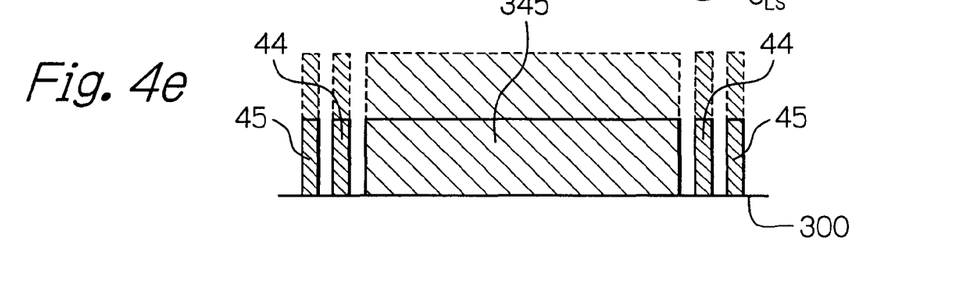
Figure 4F:
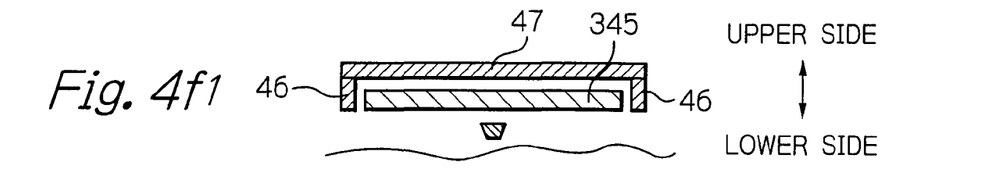
Figure 4F:
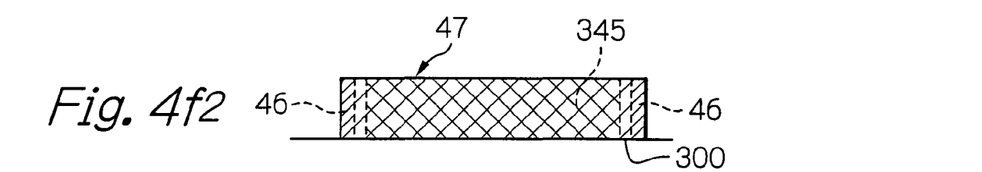
Figure 4F:
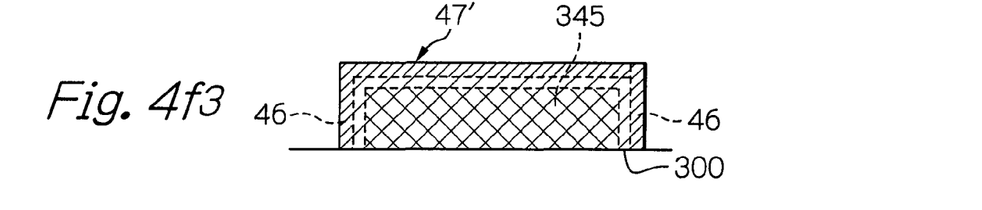

As shown in FIG. 4e, two laminate shield layers 44 and 45 are provided on each of both sides in the track width direction of the auxiliary magnetic pole layer 345, aligned in the track width direction with a non-magnetic material between them. One edges of the two laminate shield layers 44 and 45 reach the head end surface 300. Alternatively, three or more laminate shield layers may be aligned in the track width direction on each side. The alignment of a plurality of laminate shield layers enables the tolerance to external magnetic field to be more improved, as described later in a practical example.

According to FIGS. 4/1 and 4/2, laminate shield layers 46 are provided on both sides in the track width direction of the auxiliary magnetic pole layer 345. Further, provided is an over shield layer 47 which is formed so as to cover the upper surface of the auxiliary magnetic pole layer 345 through a non-magnetic material. The both end portions in the track width direction of the over shield layer 47 are connected to the upper end surfaces of the laminate shield layers 46, respectively. Further, one edge of the over shield layer 47 reach the head end surface 300. As a result, the over shield layer 47 and the laminate shield layers 46 cover totally the upper side and both sides in the track width direction of the auxiliary magnetic pole layer 345 through the non-magnetic material. Further, as shown in FIG. 4/3, an over shield layer 47' may be formed so as to cover the end surface opposite to the head end surface 300 of the auxiliary magnetic pole layer 345 through an non-magnetic material. Further providing any of these over shield layers also enables the tolerance to external magnetic field to be improved.

Figure 4G:
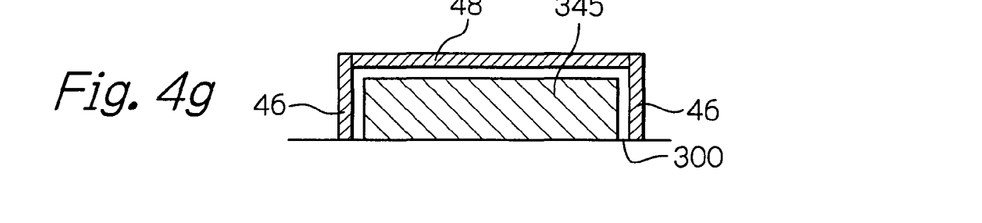

According to FIG. 4g, laminate shield layers 46 are provided on both sides in the track width direction of the auxiliary magnetic pole layer 345. Further, a rear shield layer 48 is provided adjacently, through a non-magnetic material, on the opposite side to the head end surface 300 of the auxiliary magnetic pole layer 345. The both ends of the rear shield layer 48 are connected to the end portions on the opposite side to the head end surface of the laminate shield layers 46, respectively. Further providing the rear shield layer also enables the tolerance to external magnetic field to be improved.

Figure 4H:
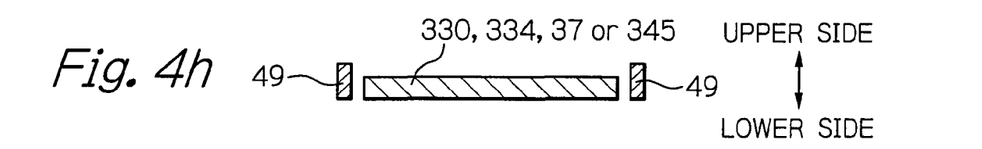
Figure 4I:
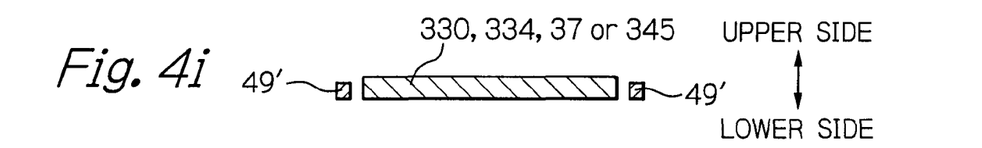
Figure 4J:
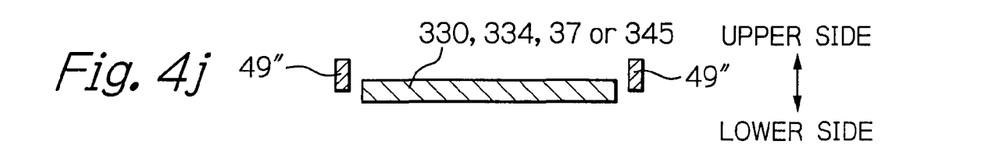

According to FIG. 4h, comparing laminate shield layers 49 provided on both sides in the track width direction of the auxiliary magnetic pole layer 345 (or shield layer 330, 334 or 37) with the auxiliary magnetic pole layer 345 (or shield layer 330, 334 or 37), the positions in the up-and-down direction of the lower ends are the same as each other. However, the thickness of the laminate shield layers 49 is set to be larger. On the contrary, according to FIG. 4i, the thickness of the laminate shield layers 49' is set to be smaller. Further, as shown in FIG. 4j, laminate shield layers 49" shift upward compared to the auxiliary magnetic pole layer 345. Providing any of these laminate shield layers also enables the tolerance to external magnetic field to be improved.

Hereinafter, the effect of improving the tolerance to external magnetic field by providing the laminate shield layers according to the present invention will be presented with use of simulation results.

[Explanation of Samples 1 to 4]

FIGS. 5a to 5d show top views schematically illustrating the configurations of the shield layer (or the magnetic pole layer) and the laminate shield layers of samples 1 to 4 for simulation, respectively. The top views in FIGS. 5a to 5d are obtained when viewing down from the upper side of the element formation surface 31 as well as FIG. 3b.

Figure 5A:
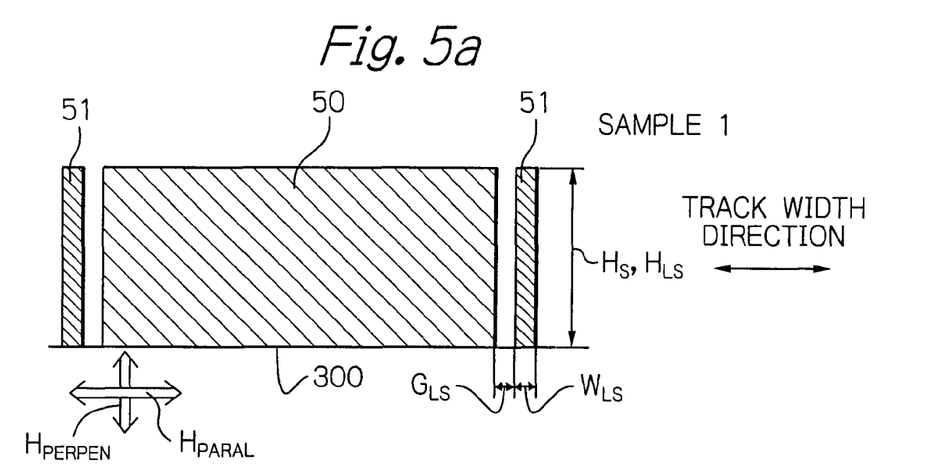
FIGS. 5a to 5d show top views schematically illustrating the configurations of the shield layer (or the magnetic pole layer) and the laminate shield layers of samples 1 to 4 for simulation, respectively.

As shown in FIG. 5a, sample 1 has a configuration in which laminate shield layers 51 are disposed on both sides in the track width direction of the shield layer 50. The height $H_S$ of the shield layer 50 and the height $H_{LS}$ of the laminate shield layers 51 were 24 µm. The width in the track width direction of the shield layer 50 was 90 µm. In sample 1, the degree of the tolerance to external magnetic field was examined under the condition of varying the gap width $G_{LS}$ and the width $W_{LS}$ of the laminate shield layer 51 as design parameters.

The degree of the tolerance to external magnetic field was estimated with an effective magnetic field (an effective field) $H_{EFF}$. The effective field $H_{EFF}$ was defined as a maximum value of the magnetic field generated at a position on the recording layer of a magnetic disk and directly below the end reaching the head end surface 300 of the shield layer 50, when a predetermined external magnetic field was applied to the whole sample. Actually, the effective field $H_{EFF}$ was defined as the following expression:

$$H_{EFF}=(H_{PARAL}^{2/3}+H_{PERPEN}^{2/3})^{3/2} \qquad (1)$$

where $H_{PARAL}$ was a component of magnetic field in the track width direction at the position on the recording layer, and $H_{PERPEN}$ was a component of magnetic field in the direction perpendicular to the surface of the recording layer.

The smaller the $H_{EFF}$ value is, the higher becomes the tolerance to external magnetic field of the head. In the simulation described below, a normalized $H_{EFF}$ was used in each sample, where the $H_{EFF}$ value of the conventional configuration without laminate shield layers was set to be 1. Therefore, The smaller compared to 1 the normalized $H_{EFF}$ value is, the higher becomes the tolerance to external magnetic field.

Figure 5B:
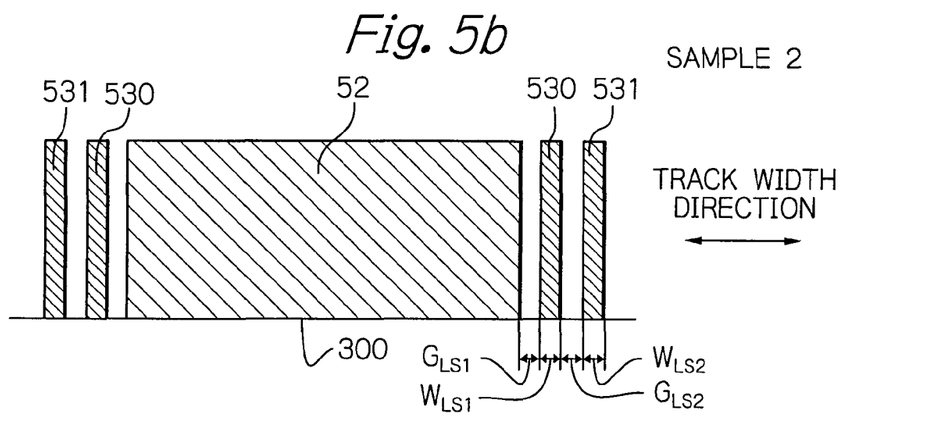

As shown in FIG. 5b, sample 2 has a configuration in which two laminate shield layers 530 and 531 are disposed on each of both sides in the track width direction of the shield layer 52. The height of the shield layer 52, the height of the laminate shield layers 530 and 531, and the width in the track width direction of the shield layer 52 were the same as those of sample 1. In sample 2, the degree of the tolerance to external magnetic field was examined under varying the gap width $G_{LS2}$ between two laminate shield layers 530 and 531 as a design parameter.

Figure 5C:
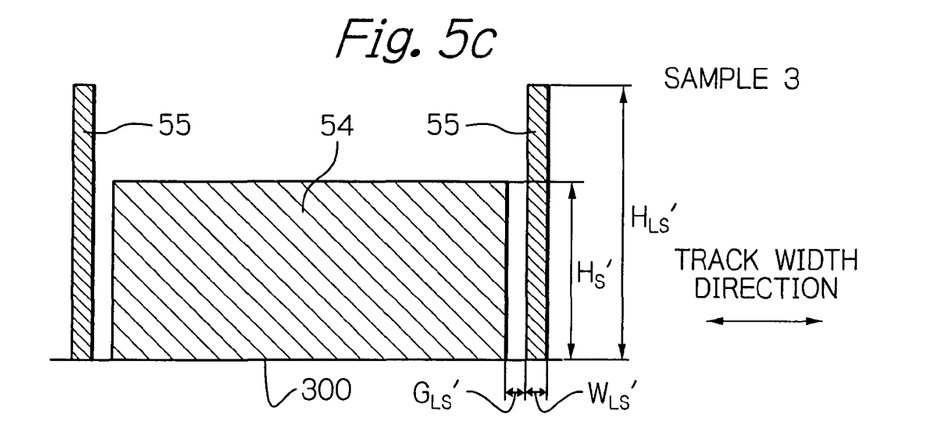

As shown in FIG. 5c, sample 3 has a configuration in which laminate shield layers 55 having a height larger than that of the shield layer 54 are disposed on both sides in the track width direction of the shield layer 54. One edges of the shield layer 54 and the laminate shield layers 55 reach the head end surface 300. The height $H_S'$ of the shield layer 54 was 24 μm, and the height $H_{LS}'$ of the laminate shield layers 55 was 36 μm, that is, 1.5 times larger than the height $H_S'$. The width the track width direction of the shield layer 54 was the same as that of sample 1. In sample 3, the degree of the tolerance to external magnetic field was examined under the condition of a predetermined gap width $G_{LS}'$ and a predetermined width $W_{LS}'$ of the laminate shield layer 55, compared with the result of sample 1.

Figure 5D:
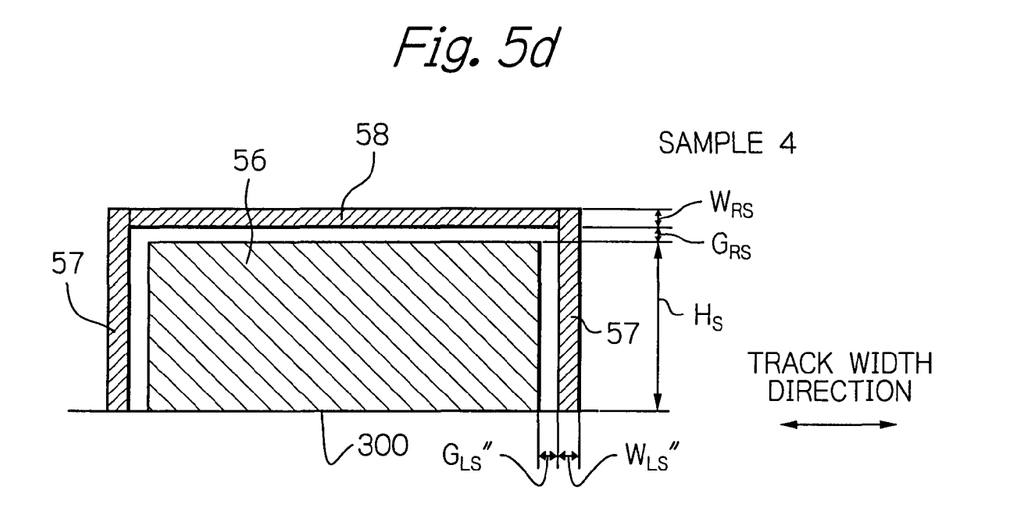

According to FIG. 5d, in sample 4, laminate shield layers 57 and a rear shield layer 58 are disposed adjacently on both sides in the track width direction of the shield layer 56 and on the opposite side to the head end surface 300 of the shield layer 56. The height Hs of the shield layer 56 was 24 μm, and the width in the track width direction of the shield layer 56 was 90 μm. In sample 4, the degree of the tolerance to external magnetic field was examined under the condition of a predetermined gap widths $G_{LS}''$ and $G_{RS}$, a predetermined width $W_{LS}''$ of the laminate shield layer 57, and a predetermined width $W_{RS}$ of the rear shield layer 58, compared with the result of sample 1.

[Simulation Result of Sample 1]

Figure 6:
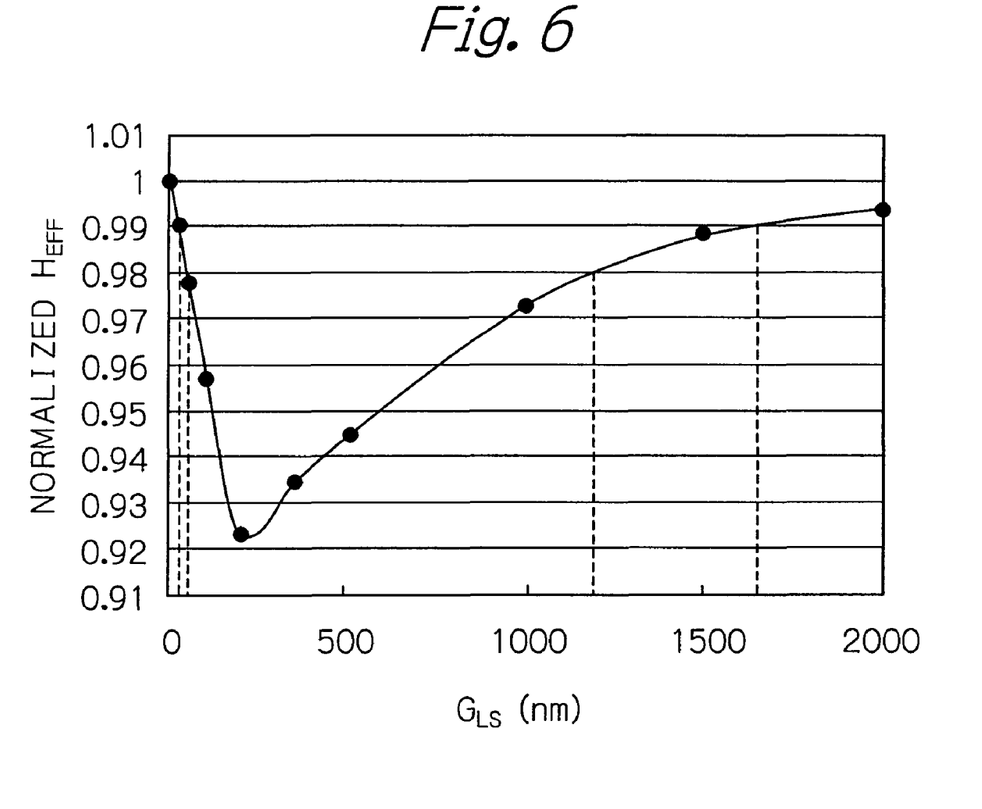
FIG. 6 shows a graph illustrating the relation between the gap width $G_{LS}$ and the normalized effective field $H_{EFF}$ in sample 1.

FIG. 6 shows a graph illustrating the relation between the gap width $G_{LS}$ and the normalized effective field $H_{EFF}$ in sample 1 (FIG. 5a). Here, the width $W_{LS}$ of the laminate shield layer 51 was set to be 200 nm. Further, the magnetic field applied to the whole sample in the simulation had a direction perpendicular to the head end surface 300 (to the surface of the magnetic disk) and an intensity of 200 Oe (oersted) (5.9 kA/m).

As shown in FIG. 6, the effective field $H_{EFF}$ decreases rapidly as the gap width $G_{LS}$ increases from zero, and takes a minimum value when the gap width $G_{LS}$ becomes 200 nm. Then, the effective field $H_{EFF}$ turns to increase as the gap width $G_{LS}$ increases, and asymptotically gets close to 1. In fact, the manufacturing floor requires effective field $H_{EFF}$ to be reduced by at least 1%, where the effective field $H_{EFF}$ is regarded as an index parameter to indicate the degree of the tolerance to external magnetic field. Further, the reduction of the effective field $H_{EFF}$ by 2% is considered more preferable. Therefore, according to the result shown in FIG. 6, to improve the tolerance to external magnetic field, it is understood that the gap width $G_{LS}$ is preferably in the range from 20 nm to 1700 nm, and the gap width $G_{LS}$ is more preferably in the range from 50 nm to 1200 nm.

Figure 7:
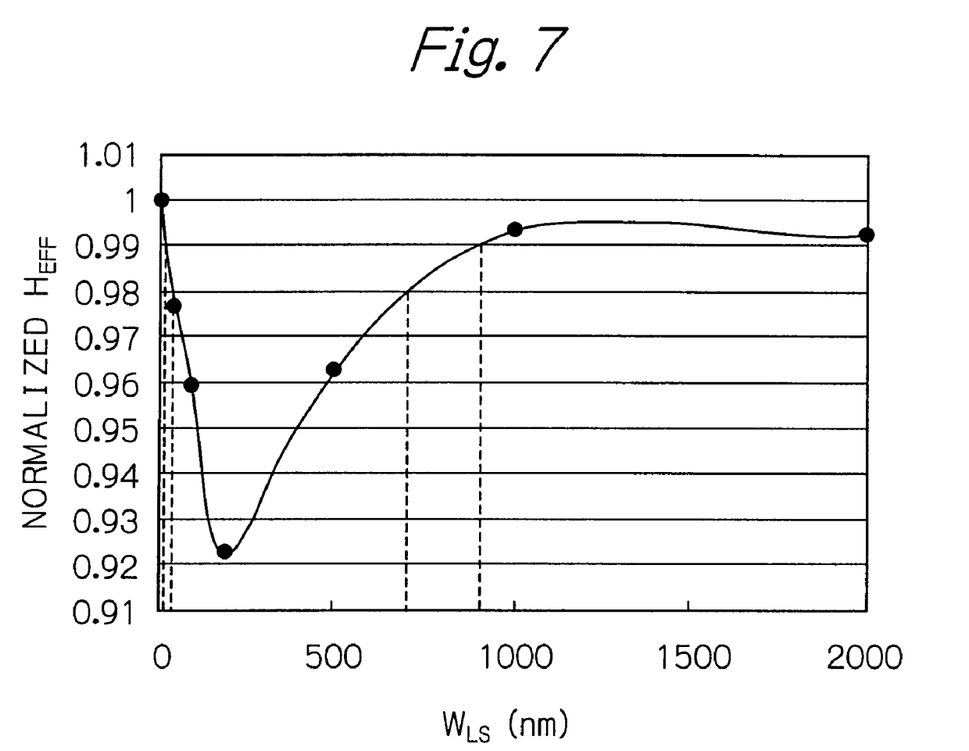
FIG. 7 shows a graph illustrating the relation between the width $W_{LS}$ of the laminate shield layer and the normalized effective field $H_{EFF}$ in sample 1.

FIG. 7 shows a graph illustrating the relation between the width $W_{LS}$ of the laminate shield layer 51 and the normalized effective field $H_{EFF}$ in sample 1 (FIG. 5a). Here, the gap width $G_{LS}$ was set to be 200 nm. Further, the magnetic field applied to the whole sample in the simulation had a direction perpendicular to the head end surface 300 (to the surface of the magnetic disk) and an intensity of 200 Oe (5.9 kA/m), as well as the case in FIG. 6.

As shown in FIG. 7, the effective field $H_{EFF}$ decreases rapidly as the width $W_{LS}$ increases from zero, and takes a minimum value when the width $W_{LS}$ becomes 200 nm. Then, the effective field $H_{EFF}$ turns to increase as the width $W_{LS}$ increases, and behaves so as to get close to a value between 0.99 and 1. Here, on applying the above-described index parameter for the tolerance to external magnetic field, it is understood that the width $W_{LS}$ is preferably in the range from 20 nm to 900 nm, and the width $W_{LS}$ is more preferably in the range from 40 nm to 700 nm, to improve the tolerance to external magnetic field.

[Simulation Result of Sample 2]

Table 1 shows the normalized effective field $H_{EFF}$ of sample 2, comparing with the effective fields $H_{EFF}$ of sample 1 and conventional example. Here, the number of the laminate shield layer indicates the number presented on one side in the track width direction, that is, the total number is double the number. Here, all the widths $W_{LS1}$ and $W_{LS2}$ of the laminate shield layers were 200 nm, and the gap widths $G_{LS1}$ and $G_{LS2}$ were set to be 200 nm. Further, the magnetic field applied to the whole sample in the simulation had a direction perpendicular to the head end surface 300 (to the surface of the magnetic disk) and an intensity of 200 Oe (5.9 kA/m), as well as the case in FIG. 6.

TABLE 1

| | The number of laminate shield layer | | |
|---|---|---|---|
| | 0: conventional | 1: sample 1 | 2: sample 2 |
| $H_{EFF}$ | 1 | 0.923 | 0.860 |

As shown in Table 1, the effective field $H_{EFF}$ becomes smaller as the number of the laminate shield layer increases in the order of the conventional example, sample 1, sample 2. The reduction rate of the effective field $H_{EFF}$ in sample 2 becomes approximately double the rate in sample 1. As described above, it is understood that the tolerance to external magnetic field can be more improved by providing two or more laminate shield layers on each of both sides in the track width direction of the shield layer (or the magnetic pole layer), where the laminate shield layers reach the head end surface 300 and are aligned in the track width direction with a non-magnetic material between them.

Figure 8:
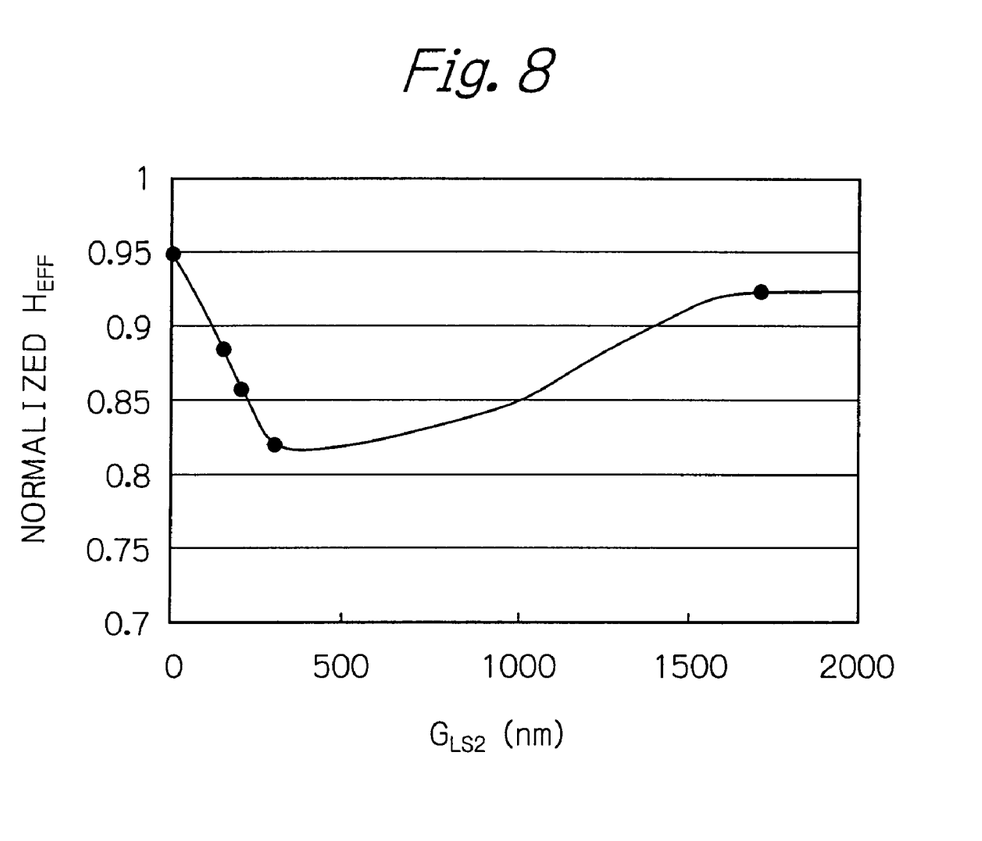
FIG. 8 shows a graph illustrating the relation between the gap width $G_{LS2}$ and the normalized effective field $H_{EFF}$ in sample 2.

FIG. 8 shows a graph illustrating the relation between the gap width $G_{LS2}$ and the normalized effective field $H_{EFF}$ in sample 2 (FIG. 5b). Here, the widths $W_{LS1}$ and $W_{LS2}$ of the laminate shield layers 530 and 531 were 200 nm, and the gap width $G_{LS1}$ was set to be 200 nm. Further, the magnetic field applied to the whole sample in the simulation had a direction perpendicular to the head end surface 300 (to the surface of the magnetic disk) and an intensity of 200 Oe (5.9 kA/m), as well as the case in FIG. 6.

As shown in FIG. 8, the effective field $H_{EFF}$ decreases widely as the gap width $G_{LS2}$ increases from 150 nm to 300 nm. Especially, the effective field $H_{EFF}$ becomes 0.820 when the gap width $G_{LS2}$ is 300 nm, which shows significant improvement of the tolerance to external magnetic field. Then, the effective field $H_{EFF}$ turns to increase as the gap width $G_{LS2}$ increases, and becomes 0.923 that is equal to the sample 1 when the gap width $G_{LS2}$ is 1700 nm. This result indicates that the advantage due to the second laminate shield layer almost vanishes when the gap width $G_{LS2}$ reaches 1700 nm. From the result, in the configuration of sample 2 where two laminate shield layers 530 and 531 are disposed on each of both sides of the shield layer, the gap width $G_{LS2}$ between the two laminate shield layers is considered to be a significantly important design parameter. And it is understood that adjusting the gap width $G_{LS2}$ can realize higher tolerance to external magnetic field.

[Simulation Results of Samples 3 and 4]

Table 2 shows the normalized effective fields $H_{EFF}$ of samples 3 and 4, comparing with the effective field $H_{EFF}$ of sample 1. Here, in sample 3, the width $W_{LS'}$ of the laminate shield layer and the gap width $G_{LS}'$ were 200 nm. Also in sample 1, the width $W_{LS}$ of the laminate shield layer and the gap width $G_{LS}$ were set to be 200 nm. Further, in sample 4, the gap widths $G_{LS}''$ and $G_{RS}$, the width $W_{LS}''$ of the laminate shield layer 57, and the width $W_{RS}$ of the rear shield layer 58 were 200 nm. Further, in these samples, the magnetic field applied to the whole sample in the simulation was a magnetic field of 200 Oe (5.9 kA/m) along the track width direction, with the purpose of comparing the tolerances to external magnetic field in the track width direction of these samples.

TABLE 2

|  | Sample 1 | Sample 3 | Sample 4 |
| --- | --- | --- | --- |
| $H_{EFF}$ | 0.926 | 0.937 | 0.927 |

As shown in Table 2, the effective field $H_{EFF}$ of sample 3 becomes sufficiently small, however, somewhat larger than that of sample 1. From the result, sample 1, in which the laminate shield layers and the shield layer (magnetic pole layer) have the same height, is understood to have higher tolerance to external magnetic field than sample 3 in which the laminate shield layer has larger height. This is thought to be because, in applying the external magnetic field along the track width direction, the more the laminate shield layer exceeds the shield layer (the magnetic pole layer) in height, the more magnetic flux is gathered to the shield layer (the magnetic pole layer). Therefore, it is understood that the height of the laminate shield layer is preferably set to be equal to that of the shield layer (the magnetic pole layer).

Also as shown in Table 2, the effective field $H_{EFF}$ of sample 4 becomes smaller than that of sample 3, and has a sufficiently small value nearly equal to that of sample 1. Therefore, it is understood that the configuration of sample 4 can improve the tolerance to external magnetic field to the same degree as sample 1.

From the above-described results, it is understood that the tolerance to external magnetic field can be improved sufficiently by adjusting the number of the laminate shield layer according to the present invention, the gap width, and the width in the track width direction of the laminate shield layer as design parameters, or by additionally providing the rear shield layer.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head comprising:
a magnetoresistive element for reading data, comprising a lower shield layer and an upper shield layer provided so as to sandwich a magnetoresistive multilayer therebetween, one of edges of each of the upper and lower shield layers reaching a head end surface on an air bearing surface side; and
an electromagnetic transducer for writing data, comprising a main magnetic pole layer and an auxiliary magnetic pole layer, one of edges of each of the main and auxiliary magnetic pole layers reaching the head end surface,
at least one laminate shield layer for tolerating an external magnetic field, provided adjacently through a non-magnetic material on one side or on both sides in a track width direction of at least one layer out of said lower shield layer, said upper shield layer and said auxiliary magnetic pole layer, and one edge of said at least one laminate shield layer reaching the head end surface.

2. The thin-film magnetic head as claimed in claim 1, wherein a spacing in the track width direction between the laminate shield layer and said at least one layer out of said lower shield layer, said upper shield layer and said auxiliary magnetic pole layer is in a range from 20 nanometers to 1700 nanometers.

3. The thin-film magnetic head as claimed in claim 1, wherein a width in the track width direction of the laminate shield layer is in a range from 20 nanometers to 900 nanometers.

4. The thin-film magnetic head as claimed in claim 1, wherein a height of the laminate shield layer from the head end surface is equal to or smaller than a height of said at least one layer out of said lower shield layer, said upper shield layer and said auxiliary magnetic pole layer.

5. The thin-film magnetic head as claimed in claim 1, wherein a plurality of laminate shield layers, aligned in the track width direction with a non-magnetic material therebetween, are provided adjacently on each of both sides in the track width direction of at least one layer out of said lower shield layer, said upper shield layer and said auxiliary magnetic pole layer, and one of edges of each of said plurality of laminate shield layers reach the head end surface.

6. The thin-film magnetic head as claimed in claim 1, wherein an inter-element shield layer is provided between said magnetoresistive element and said electromagnetic transducer, and laminate shield layers for tolerating an external magnetic field are further provided adjacently through a non-magnetic material on both sides in the track width direction of said inter-element shield layer, one of edges of each of said laminate shield layers reaching the head end surface.

7. The thin-film magnetic head as claimed in claim 1, wherein the laminate shield layers are provided on both sides in the track width direction of said auxiliary magnetic pole layer, and an over shield layer is further provided so as to cover an upper surface of said auxiliary magnetic pole layer through a non-magnetic material, both end portions in the track width direction of said over shield layer connected respectively to upper end surfaces of said laminate shield layers.

8. The thin-film magnetic head as claimed in claim 7, wherein said over shield layer is formed so as to cover an end surface opposite to the head end surface of said auxiliary magnetic pole layer through a non-magnetic material.

9. The thin-film magnetic head as claimed in claim 1, wherein the laminate shield layers are provided on both sides in the track width direction of said auxiliary magnetic pole layer, and a rear shield layer is further provided adjacently through a non-magnetic material on the opposite side to the head end surface of said auxiliary magnetic pole layer, both ends of said rear shield layer connected respectively to end portions on the opposite side to the head end surface of said laminate shield layers.

10. A head gimbal assembly comprising a thin-film magnetic head comprising:
   a magnetoresistive element for reading data, comprising a lower shield layer and an upper shield layer provided so as to sandwich a magnetoresistive multilayer therebetween, one of edges of each of the upper and lower shield layers reaching a head end surface on an air bearing surface side; and
   an electromagnetic transducer for writing data, comprising a main magnetic pole layer and an auxiliary magnetic pole layer, one of edges of each of the main and auxiliary magnetic pole layers reaching the head end surface,
   at least one laminate shield layer for tolerating an external magnetic field, provided adjacently through a non-magnetic material on one side or on both sides in a track width direction of at least one layer out of said lower shield layer, said upper shield layer and said auxiliary magnetic pole layer, and one edge of said at least one laminate shield layer reaching the head end surface,
   said head gimbal assembly further comprising:
   signal lines for said magnetoresistive element and said electromagnetic transducer; and
   a support means for supporting said thin-film magnetic head.

11. The head gimbal assembly as claimed in claim 10, wherein a spacing in the track width direction between the laminate shield layer and said at least one layer out of said lower shield layer, said upper shield layer and said auxiliary magnetic pole layer is in a range from 20 nanometers to 1700 nanometers.

12. The head gimbal assembly as claimed in claim 10, wherein a width in the track width direction of the laminate shield layer is in a range from 20 nanometers to 900 nanometers.

13. The head gimbal assembly as claimed in claim 10, wherein a height of the laminate shield layer from the head end surface is equal to or smaller than a height of said at least one layer out of said lower shield layer, said upper shield layer and said auxiliary magnetic pole layer.

14. The head gimbal assembly as claimed in claim 10, wherein a plurality of laminate shield layers, aligned in the track width direction with a non-magnetic material therebetween, are provided adjacently on each of both sides in the track width direction of at least one layer out of said lower shield layer, said upper shield layer and said auxiliary magnetic pole layer, and one of edges of each of said plurality of laminate shield layers reach the head end surface.

15. The head gimbal assembly as claimed in claim 10, wherein an inter-element shield layer is provided between said magnetoresistive element and said electromagnetic transducer, and laminate shield layers for tolerating external magnetic field are further provided adjacently through a non-magnetic material on both sides in the track width direction of said inter-element shield layer, one of edges of each of said laminate shield layers reaching the head end surface.

16. The head gimbal assembly as claimed in claim 10, wherein the laminate shield layers are provided on both sides in the track width direction of said auxiliary magnetic pole layer, and an over shield layer is further provided so as to cover an upper surface of said auxiliary magnetic pole layer through a non-magnetic material, both end portions in the track width direction of said over shield layer connected respectively to upper end surfaces of said laminate shield layers.

17. The head gimbal assembly as claimed in claim 16, wherein said over shield layer is formed so as to cover an end surface opposite to the head end surface of said auxiliary magnetic pole layer through a non-magnetic material.

18. The head gimbal assembly as claimed in claim 10, wherein the laminate shield layers are provided on both sides in the track width direction of said auxiliary magnetic pole layer, and a rear shield layer is further provided adjacently through a non-magnetic material on the opposite side to the head end surface of said auxiliary magnetic pole layer, both ends of said rear shield layer connected respectively to end portions on the opposite side to the head end surface of said laminate shield layers.

19. A magnetic recording and reproducing apparatus comprising at least one head gimbal assembly comprising a thin-film magnetic head comprising:
   a magnetoresistive element for reading data, comprising a lower shield layer and an upper shield layer provided so as to sandwich a magnetoresistive multilayer therebetween, one of edges of each of the upper and lower shield layers reaching a head end surface on an air bearing surface side; and
   an electromagnetic transducer for writing data, comprising a main magnetic pole layer and an auxiliary magnetic pole layer, one of edges of each of the main and auxiliary magnetic pole layers reaching the head end surface,
   at least one laminate shield layer for tolerating an external magnetic field, provided adjacently through a non-magnetic material on one side or on both sides in a track width direction of at least one layer out of said lower shield layer, said upper shield layer and said auxiliary magnetic pole layer, and one edge of said at least one laminate shield layer reaching the head end surface,
   said head gimbal assembly further comprising:
   signal lines for said magnetoresistive element and said electromagnetic transducer; and
   a support means for supporting said thin-film magnetic head,
   said magnetic recording and reproducing apparatus further comprising:
   at least one magnetic recording medium; and
   a recording/reproducing means for controlling read and write operations of said thin-film magnetic head to said at least one magnetic recording medium.

20. The magnetic recording and reproducing apparatus as claimed in claim 19, wherein a spacing in the track width direction between the laminate shield layer and said at least one layer out of said lower shield layer, said upper shield layer and said auxiliary magnetic pole layer is in a range from 20 nanometers to 1700 nanometers.

21. The magnetic recording and reproducing apparatus as claimed in claim 19, wherein a width in the track width direction of the laminate shield layer is in a range from 20 nanometers to 900 nanometers.

22. The magnetic recording and reproducing apparatus as claimed in claim 19, wherein a height from the had end surface of the laminate shield layer from the head end surface is equal to or smaller than a height of said at least one layer out of said lower shield layer, said upper shield layer and said auxiliary magnetic pole layer.

23. The magnetic recording and reproducing apparatus as claimed in claim 19, wherein a plurality of laminate shield layers, aligned in the track width direction with a non-magnetic material therebetween, are provided adjacently on each of both sides in the track width direction of at least one layer out of said lower shield layer, said upper shield layer and said auxiliary magnetic pole layer, and one of edges of each of said plurality of laminate shield layers reach the head end surface.

24. The magnetic recording and reproducing apparatus as claimed in claim 19, wherein an inter-element shield layer is provided between said magnetoresistive element and said electromagnetic transducer, and laminate shield layers for tolerating external magnetic field are further provided adjacently through a non-magnetic material on both sides in the track width direction of said inter-element shield layer, one of edges of each of said laminate shield layers reaching the head end surface.

25. The magnetic recording and reproducing apparatus as claimed in claim 19, wherein the laminate shield layers are provided on both sides in the track width direction of said auxiliary magnetic pole layer, and an over shield layer is further provided so as to cover an upper surface of said auxiliary magnetic pole layer through a non-magnetic material, both end portions in the track width direction of said over shield layer connected respectively to upper end surfaces of said laminate shield layers.

26. The magnetic recording and reproducing apparatus as claimed in claim 25, wherein said over shield layer is formed so as to cover an end surface opposite to the head end surface of said auxiliary magnetic pole layer through a non-magnetic material.

27. The magnetic recording and reproducing apparatus as claimed in claim 19, wherein the laminate shield layers are provided on both sides in the track width direction of said auxiliary magnetic pole layer, and a rear shield layer is further provided adjacently through a non-magnetic material on the opposite side to the head end surface of said auxiliary magnetic pole layer, both ends of said rear shield layer connected respectively to end portions on the opposite side to the head end surface of said laminate shield layers.

* * * * *